July 24, 1923.
G. E. BOLLMAN
TRACTOR HITCH
Filed Oct. 13, 1921
1,462,930
2 Sheets-Sheet 1
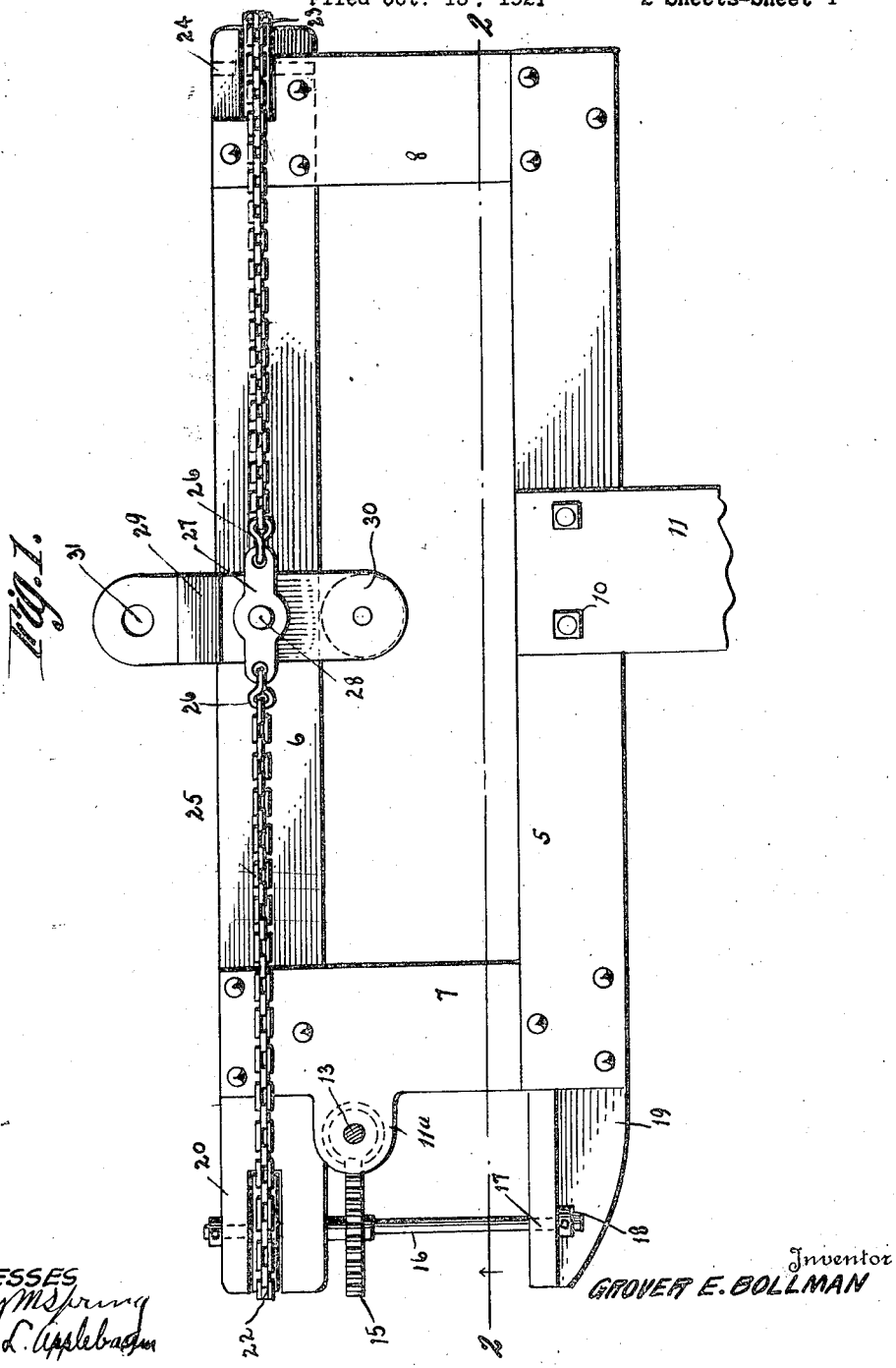
WITNESSES
Inventor
GROVER E. BOLLMAN
By Richard B. Owen
Attorney

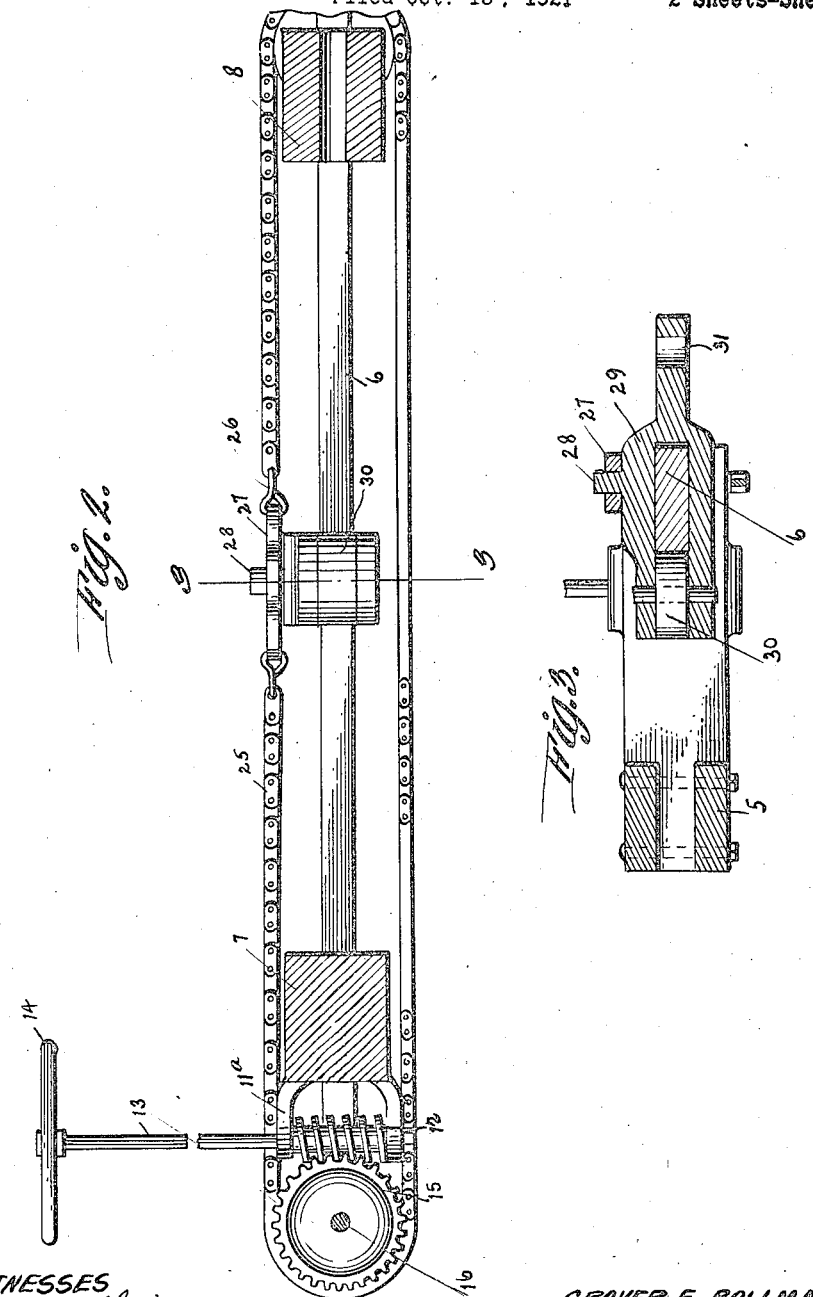

Patented July 24, 1923.

1,462,930

UNITED STATES PATENT OFFICE.

GROVER E. BOLLMAN, OF SUGARCREEK, OHIO.

TRACTOR HITCH.

Application filed October 13, 1921. Serial No. 507,537.

*To all whom it may concern:*

Be it known that I, GROVER E. BOLLMAN, citizen of the United States, residing at Sugarcreek, in the county of Tuscarawas and State of Ohio, have invented certain new and useful Improvements in Tractor Hitches, of which the following is a specification.

This invention relates to a tractor hitch and the primary object of the invention is the provision of an adjustable device whereby the tractor drawn plows may be moved transversely with respect to the main body of the tractor, so that the proper depth of furrow to be cut will be made particularly in hillside plowing.

The primary object of the invention is the construction of a tractor hitch of universal application, affording regulating means for maintaining the drawn plows in true alinement with the tractor, so that the proper depth of furrow will be made when plowing on hillsides or over rolling ground, said adjustment being effected while the tractor is in operation.

Another and very important object of the invention is the provision of a detachable tractor hitch, capable of use in connection with various types of standard tractors, and one in which the parts are extremely simple in construction, easily assembled, rigid and durable, highly efficient in operation, practical and capable of being manufactured at a very low cost, whereby its commercial possibilities are greatly enhanced.

The invention will be best understood from a consideration of the following detailed description taken in connection with the accompanying drawing forming a part of this specification, with the understanding, however, that the invention is not confined to any strict conformity with the showing in the drawing, but may be changed and modified so long as such changes and modifications mark no material departure from the salient features of the invention as expressed in the subject matter being claimed.

I attain these objects and others in the accompanying drawings, wherein:

Figure 1 is a plan view showing the device.

Figure 2 is a sectional view taken on the line 2—2 of Figure 1; and

Figure 3 is a detail sectional view taken on the line 3—3 of Figure 2.

Referring now to the drawings wherein like reference characters designate corresponding parts throughout the several views, 5 and 6 designate the transversely extending bars and 7, 8, the end connecting members which constitute the frame of the device, attachable by bolts 10 or other suitable fastening elements whereby the tongue 11 of the tractor may be attached thereto.

The end member 7 has preferably formed integral therewith a housing in the form of a yoke member 11ª wherein a worm gear 12, mounted on a vertical shaft 13 is provided, and operable by the usual hand wheel 14 whereby said worm will operate the tooth gear 15, rotatable with the longitudinally extending shaft 16. The said shaft is rotatably supported in bearings 17 and provided with collars 18 exterior of the ends 19, 20 of the respective transverse bars 5, 6 of the frame, it being observed that the bar 6 is provided with a recess at each end thereof for receiving a sprocket 22 on the shaft 16 and a second sprocket 23 mounted for rotation on a shaft 24 for the purpose now to appear.

An endless chain 25 trained over the sprockets above referred to is connected by a link or hook member 26 to the ends of a hitch connection 27, held on the pin 28 of a bifurcated hitch 29, said hitch having a bearing roller 30 for engaging the rear side of the bar 6 of the frame and provided with a recess 31 whereby the plows may be attached thereto in the manner well understood. The roller 30 permits of the easy sliding movement of the hitch transversely on the bar 6, since it will be seen that upon rotation of the gearing the sprockets 22, 23 will cause the chain 25 to pull on the said hitch to move the same either to the left or right depending on the direction of rotation of the wheel 14.

By reason of this construction it will be readily apparent that in hillside plowing, in order to keep the plows in proper alinement with the tractor and to prevent some of the plows from digging too deeply or cutting an improper furrow, that by simply adjusting the movable hitch that the plows may be maintained in proper working position during the progress of the tractor over rolling ground or on steep inclines. The above adjustment is of course effected during the progress of the tractor and does not necessitate dismounting or stopping the same during the plowing operation.

In the accompanying drawings, I have illustrated my invention embodied in one form by way of example, and which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having thus described and illustrated my invention, what I claim as new and desire to secure by Letters Patent is:

A tractor hitch comprising a frame having front and rear transverse bars and end connecting members secured thereto, a bifurcated hitch straddling said rear bar and provided with a bearing roller, a longitudinally rotatable shaft and worm gearing for operating the same disposed at one side of the frame, a sprocket mounted on said shaft and rotatable in a recess formed in the end of the rear transverse bar, a second sprocket rotatable in a recess in the opposite end of said bar, a sprocket chain trained over said sprockets and connected to the hitch member and a vertical shaft for operating said worm gearing whereby the hitch may be moved to various adjusted positions.

In testimony whereof I affix my signature in presence of two witnesses.

GROVER E. BOLLMAN.

Witnesses:
  WALTER H. ZIMMERMAN,
  CHARLEY SWIHART.